United States Patent
Fujimura (10) Patent No.: US 9,147,133 B2
(45) Date of Patent: Sep. 29, 2015

(54) PATTERN RECOGNITION DEVICE, PATTERN RECOGNITION METHOD AND COMPUTER PROGRAM PRODUCT

(75) Inventor: Hiroshi Fujimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1186 days.

(21) Appl. No.: 12/561,448

(22) Filed: Sep. 17, 2009

(65) Prior Publication Data

US 2010/0246966 A1 Sep. 30, 2010

(30) Foreign Application Priority Data

Mar. 26, 2009 (JP) ................................. 2009-076965

(51) Int. Cl.
 *G10L 21/02* (2013.01)
 *G06K 9/62* (2006.01)
 *G10L 15/065* (2013.01)
 *G10L 15/20* (2006.01)

(52) U.S. Cl.
 CPC ............ *G06K 9/6298* (2013.01); *G10L 15/065* (2013.01); *G10L 15/20* (2013.01); *G10L 21/02* (2013.01)

(58) Field of Classification Search
 CPC ................................ G10L 21/02; G10L 15/20
 USPC ................................................. 704/224, 233
 See application file for complete search history.

(56) References Cited

U.S. PATENT DOCUMENTS 5,590,242 A 12/1996 Juang et al.
5,727,124 A * 3/1998 Lee et al. ...................... 704/233
5,806,022 A * 9/1998 Rahim et al. .................. 704/205
6,876,966 B1 * 4/2005 Deng et al. .................... 704/233
6,965,860 B1 * 11/2005 Rees et al. ..................... 704/227

(Continued)

FOREIGN PATENT DOCUMENTS

| JP | 07-160288 | 6/1995 |
| JP | 09-258783 | 10/1997 |
| JP | 10-149190 | 6/1998 |

OTHER PUBLICATIONS

Afify et al. "A General Joint Additive and Convolutive Bias Compensation Approach Applied to Noisy Lombard Speech Recognition", IEEE Transactions on Speech and Audio Processing, vol. 6, No. 6, Nov. 1998.*

(Continued)

*Primary Examiner* — Jialong He
(74) *Attorney, Agent, or Firm* — Amin, Turocy & Watson, LLP (57) ABSTRACT

A pattern recognition device includes a feature vector calculator; a model selecting unit; a correction vector calculator; a feature vector correcting unit; and a pattern recognition unit. The correction vector calculator calculates, for each of the selection models, a modified directional vector having N dimensional components (N≥1). A value of the n-th dimensional component (N≥n≥1) of the modified directional vector is obtained by subtracting a value of the n-th dimensional component of the variance vector multiplied by a predetermined coefficient from an absolute value of the n-th component of a different vector between the average vector and feature vectors to obtain a first value, and then multiplying the first value by a plus or minus sign identical to a sign of the n-th dimensional component of the difference vector, and further calculate a correction vector with respect to a vector obtained by superimposing the modified directional vectors.

10 Claims, 5 Drawing Sheets

(56) References Cited

U.S. PATENT DOCUMENTS

| | | | | |
|---|---|---|---|---|
| 2002/0165712 | A1* | 11/2002 | Souilmi et al. | 704/233 |
| 2002/0177998 | A1* | 11/2002 | Gong | 704/226 |
| 2003/0187637 | A1* | 10/2003 | Kang et al. | 704/226 |
| 2005/0256714 | A1* | 11/2005 | Cui et al. | 704/256.4 |
| 2007/0033027 | A1* | 2/2007 | Yao | 704/233 |
| 2008/0243506 | A1* | 10/2008 | Sakai et al. | 704/256.4 |
| 2010/0169090 | A1* | 7/2010 | Cui et al. | 704/233 |

OTHER PUBLICATIONS

Kim et al. "Cepstrum-Domain Acoustic Feature Compensation Based on Decomposition of Speech and Noise for ASR in Noisy Environments", IEEE Transactions on Speech and Audio Processing, vol. 11, No. 5, Sep. 2003.*

Lee, "On stochastic feature and model compensation approaches to robust speech recogntion", Speech Communication, vol. 25, p. 29-47, 1998.*

Cui et al. "Noise Robust Speech Recognition Using Feature Compensation Based on Polynomial Regression of Utterance SNR", IEEE Transactions on Speech and Audio Processing, vol. 13, No. 6, Nov. 2005.*

Leggetter et al, Maximum likelihood linear regression for speaker adaptation of continuous density hidden Markov models, Computer Speech and Language, 1995, vol. 9, pp. 171-185.

Atal et al, Effectiveness of linear prediction characteristics of the speech wave for automatic speaker identification and verification, 1974, vol. 55, No. 6, pp. 1304-1312.

Japanese Office Action for Japanese Application No. 2009-076965 mailed on Aug. 14, 2012.

* cited by examiner

PATTERN RECOGNITION DEVICE, PATTERN RECOGNITION METHOD AND COMPUTER PROGRAM PRODUCT

CROSS-REFERENCE TO RELATED APPLICATIONS

This application is based upon and claims the benefit of priority from the prior Japanese Patent Application No. 2009-076965, filed on Mar. 26, 2009; the entire contents of which are incorporated herein by reference.

BACKGROUND OF THE INVENTION

1. Field of the Invention

The present invention relates to a pattern recognition device, a pattern recognition method and a computer program product.

2. Description of the Related Art

When performing speech recognition, a feature of speech to be recognized is compared with models that have learned speech features to determine which model is close to the speech to be recognized. In speaker-independent speech recognition, speaker and noise environment are different between when a model learns and when the model is used for speech recognition, so that bias occurs between the model and an input speech feature. As a representative method for reducing an influence exerted by the bias, there is a CMN method (see B. Atal, "Effectiveness of linear prediction characteristics of the speech wave for automatic speaker identification and verification," J. Acoust. Soc. AM., vol. 55, pp. 1304-1312, 1974).

In the CMN method, feature amounts in a certain defined time section are averaged and an average value thus obtained is subtracted from each feature amount, so as to remove the influence by the bias. The CMN method is effective as the method of reducing the influence by the bias, and a calculation amount thereof is small.

As another method of removing the effect of the bias, there is an MLLR method (see C. J. Leggetter and P. C. Woodland, "Maximum likelihood linear regression for speaker adaptation of continuous-density hidden Markov models", Computer Speech and Language, vol. 9, pp. 171-185, 1995) and an SBR method (see U.S. Pat. No. 5,590,242). In the MLLR method, a condition in which the bias does not change in time is assumed. The SBR method uses a Hidden Markov Model (HMM) represented by a Gaussian distribution as the model. In the SBR method, the bias is corrected by approximating variance of the Gaussian distribution by a unit matrix in a bias section calculator of the MLLR method.

In the SBR method, an average of differences between an average vector of each model and each feature vector is used as a correction vector, and a feature vector is corrected by subtracting the average vector from the feature vector. Thus, the correction taking into account the influence of the noise and the like can be performed.

However, in the SBR method, because the variance of the model distribution is approximated, there may be a case in which bias correction performance is deteriorated. On the other hand, in the MLLR method, because the correction vector is a weighted average obtained by weighting the difference between the average vector of the models and the feature vector with standard deviation, and a condition in which the bias does not change in time is assumed, the correction performance is deteriorated when the bias sequentially changes.

SUMMARY OF THE INVENTION

According to an aspect of the present invention, a A pattern recognition device includes a feature vector calculator configured to calculate a feature vector from input pattern; a model selecting unit configured to select, from models, one or more selection models whose distances from the feature vector are within a predetermined range, each of the models being represented by both an average vector of a pattern and a variance vector indicating variance of the pattern, and the average vector and the variance vector each having N dimensional components ($N \geq 1$); a correction vector calculator configured to calculate, for each of the selection models, a modified directional vector having the N dimensional components, a value of an n-th dimensional component ($N \geq n \geq 1$) of the modified directional vector being obtained by subtracting a value of the n-th dimensional component of the variance vector multiplied by a predetermined coefficient from an absolute value of the n-th component of a different vector between the average vector and the feature vector to obtain a first value, and then multiplying the first value by a plus or minus sign identical to a sign of the n-th dimensional component of the difference vector, and further calculate a correction vector with respect to a vector obtained by superimposing the modified directional vectors; a feature vector correcting unit configured to correct the feature vector by using the correction vector; and a pattern recognition unit configured to perform recognition of the input pattern by using the feature vector corrected.

According to another aspect of the present invention, a computer program product having a computer readable medium including programmed instructions. The instructions, when executed by a computer, cause the computer to perform calculating a feature vector from input pattern; selecting, from models, one or more selection models whose distances from the feature vector are within a predetermined range, each of the models being represented by both an average vector of a pattern and a variance vector indicating variance of the pattern, and the average vector and the variance vector each having N dimensional components ($N \geq 1$); calculating, for each of the selection models, a modified directional vector having the N dimensional components, a value of an n-th dimensional component ($N \geq n \geq 1$) of the modified directional vector being obtained by subtracting a value of the n-th dimensional component of the variance vector multiplied by a predetermined coefficient from an absolute value of the n-th component of a different vector between the average vector and the feature vector to obtain a first value, and then multiplying the first value by a plus or minus sign identical to a sign of the n-th dimensional component of the difference vector, and further calculate a correction vector with respect to a vector obtained by superimposing the modified directional vectors; correcting the feature vector by using the correction vector; and performing recognition of the input pattern by using the feature vector corrected.

According to still another aspect of the present invention, a pattern recognition method includes calculating, by a feature vector calculator, a feature vector from input pattern; selecting by a model selecting unit, from models, one or more selection models whose distances from the feature vector are within a predetermined range, each of the models being represented by both an average vector of a pattern and a variance vector indicating variance of the pattern, and the average vector and the variance vector each having N dimensional components ($N \geq 1$); calculating by a correction vector calculator, for each of the selection models, a modified directional vector having the N dimensional components, a value of an n-th dimensional component (N≥n≥1) of the modified directional vector being obtained by subtracting a value of the n-th dimensional component of the variance vector multiplied by a predetermined coefficient from an absolute value of the n-th component of a different vector between the average vector and the feature vector to obtain a first value, and then multiplying the first value by a plus or minus sign identical to a sign of the n-th dimensional component of the difference vector, and further calculate a correction vector with respect to a vector obtained by superimposing the modified directional vectors; correcting, by a feature vector correcting unit, the feature vector by using the correction vector; and performing, by a pattern recognition unit, recognition of the input pattern by using the feature vector corrected.

DETAILED DESCRIPTION OF THE INVENTION

Exemplary embodiments are described below with reference to drawings. An "input pattern" includes speech data, character data, image data and the like. A "pattern" includes not only a waveform of signal and the like but also a parameter relating to the waveform.

(First Embodiment)

Figure 1:
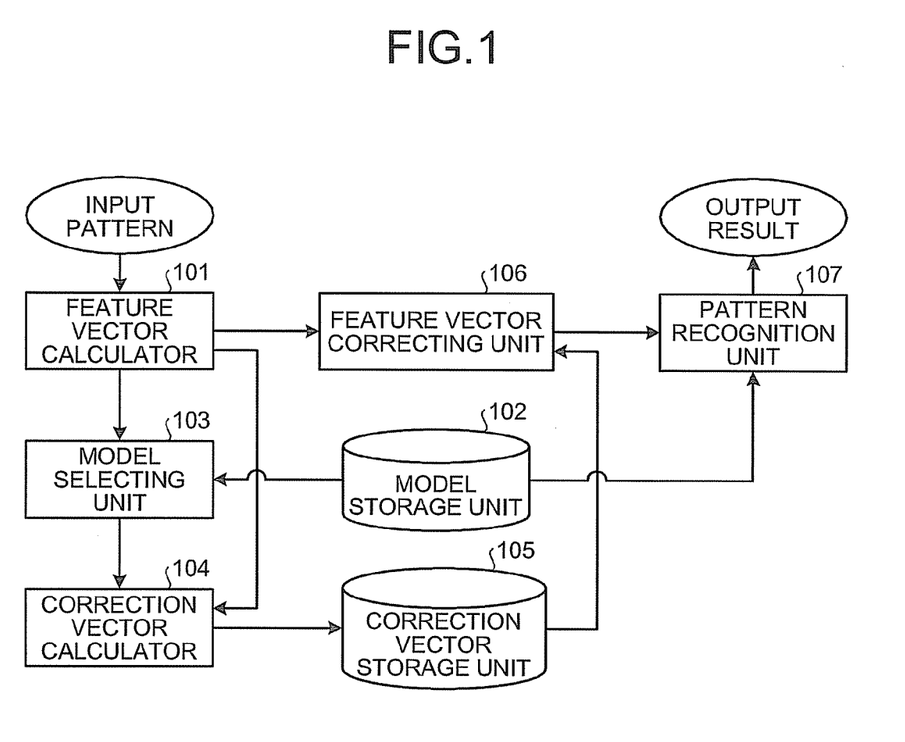
FIG. 1 is a block diagram showing a pattern recognition device according to a first embodiment.

FIG. 1 is a block diagram showing a pattern recognition device according to a first embodiment. The pattern recognition device in FIG. 1 has a feature vector calculator 101, a model storage unit 102, a model selecting unit 103, a correction vector calculator 104, a correction vector storage unit 105 and a feature vector correcting unit 106.

The feature vector calculator 101 converts the input pattern to a feature vector used in a speech recognition process. The model storage unit 102 stores therein models of their respective feature vectors obtained by training data. The model of the feature vector is used in the model selecting unit 103 and a pattern recognition unit 107.

The model selecting unit 103 receives the feature vector output by the feature vector calculator 101, and selects a model whose distance from the feature vector is short, so as to output a model parameter thereof to the correction vector calculator 104. A plurality of models may be selected.

The correction vector calculator 104 calculates a correction vector from the model selected by the model selecting unit 103 and the feature vector calculated by the feature vector calculator 101. The correction vector storage unit 105 stores therein the correction vector output by the correction vector calculator 104.

The feature vector correcting unit 106 corrects the feature vector output from the feature vector calculator 101 using the correction vector stored in the correction vector storage unit 105. The pattern recognition unit 107 performs pattern recognition using the corrected feature vector output from the feature vector correcting unit 106. In more detail, a model whose distance from the corrected feature vector is short is selected from the models stored in the model storage unit 102, and information corresponding to the selection model is output as a result of the pattern recognition.

Figure 2:
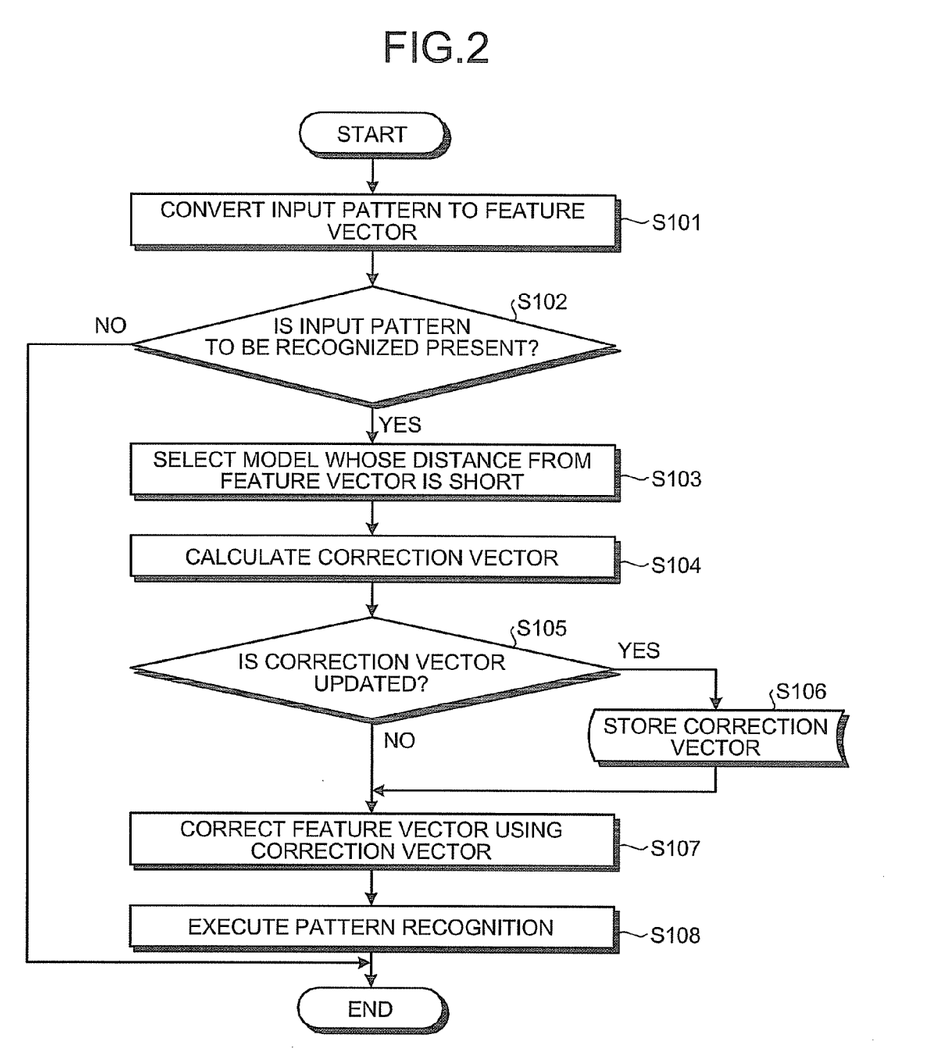
FIG. 2 is a view showing a flow chart showing a pattern recognition method according to the first embodiment.

FIG. 2 is a flow chart showing a pattern recognition method according to the first embodiment. In this embodiment, a speech recognition method performed by a speech recognition device is described as the pattern recognition method. The model having a mixture Gaussian distribution as an output probability distribution may be used as the model, and for example, this may be an HMM or a DP matching.

At step S101 in FIG. 2, the feature vector calculator 101 converts a quantized speech waveform to a feature vector for each constant time period (hereinafter, referred to as a "frame"). At step S102, it is judged whether the input pattern to be recognized is present. When the speech waveform being the input pattern is not present, the speech recognition process is finished, and when this is present, the procedure shifts to a step S103. Meanwhile, the feature vector may be created by any method, and this may be an MFCC or an LPC coefficient, for example.

Processes from the step S103 to the step S108 are performed for each frame. At step S103, the model selecting unit 103 selects M models whose "distance" from the feature vector created by the feature vector calculator 101 at step S101 is short. The model whose "distance" is short means the model having high likelihood for the feature vector.

The model in this embodiment is the HMM having the mixture Gaussian distribution as an output distribution, and herein, a Gaussian distribution constituting each mixture distribution of each state constituting the HMM is regarded as one model, and M Gaussian distributions having the high likelihood are selected.

Meanwhile, the "distance" from the feature vector is not limited to the likelihood, and a Euclidean distance between the feature vector and an average vector may also be applied, for example.

At step S104, in the correction vector calculator 104, the correction vector is calculated from the Gaussian distribution selected by the model selecting unit 103 and the feature vector output by the feature vector calculator 101. The correction vector is calculated as follows.

First, a modified value $l_{mn}$ is obtained by an expression (1) for each model m.

$$l_{mn} = \frac{x_n - z_{mn}}{|x_n - z_{mn}|}(|x_n - z_{mn}| - \alpha\sigma_{mn}) \quad \text{if } (|x_n - z_{mn}| - \alpha\sigma_{mn} > 0)$$
$$l_{mn} = 0 \quad \text{if } (|x_n - z_{mn}| - \alpha\sigma_{mn} <= 0)$$
(1)

wherein, $x_n$ is an n-th dimensional component of an input feature vector, $z_{mn}$ is n-th dimensional component of the average vector of the selected Gaussian distribution m, $\sigma_m$ is n-th dimensional component of a standard deviation vector of the selected Gaussian distribution m.

In the expression (1), a value of a coefficient $\alpha$ is preferably experimentally determined using a test set of the training data with which information obtained by the recognition is associated in advance. For example, the test set used in the speech recognition is preferably different depending on a surrounding environment of the speech and feature of the device to which the speech is input and the like.

The coefficient $\alpha$ may also be dynamically changed by feeding back a recognition result when performing the speech recognition process.

Next, the modified values $l_{mn}$ of the M selection models are averaged out by a following expression (2) to obtain an n-th dimensional modified value $l_n$ for xn. The vector having the modified value $l_n$ as the n-th dimensional component is referred to as a modified directional vector.

$$l_n = \frac{1}{M}\sum_{m=1}^{M} l_{mn} \qquad (2)$$

Meanwhile, the method of obtaining $l_n$ is not limited to the expression (2), and $l_n$ may be obtained by a likelihood-weighted average as in an expression (3).

$$l_n = \frac{\sum_{m=1}^{M} w_m l_{mn}}{\sum_{m=1}^{M} w_m} \qquad (3)$$

wherein, $w_{mn}$ is likelihood of the Gaussian distribution m for the feature vector x.

Next, the correction vector is obtained by an expression (4) using the modified directional vector.

$$b_{nt} = \beta l_{nt} + (1-\beta) b_{n,t-1} \ (0 <= \beta <= 1) \qquad (4)$$

wherein, $b_{nt}$ is an n-th dimensional component of the correction vector at time t, $l_{nt}$ is an n-th dimensional component of the modified directional vector at time t, β is a constant (0≤β≤1), and $b_{n,t-1}$ is an n-th dimensional component of the correction vector applied to the correction of the last time.

Meanwhile, $b_{n,t-1}$ is stored in the correction vector storage unit 105.

The equation to calculate the correction vector is not limited to the expression (4), and the correction vector may be obtained by averaging out the modified directional vectors by a time section T as in an expression (5).

$$b_{nta} = \frac{1}{T}\sum_{t=ta-T}^{ta} l_{nt} \qquad (5)$$

wherein, $b_{nta}$ is the n-th dimensional component of the correction vector at time ta, and $l_{ns}$ is the n-th dimensional component of the modified directional vector at time s.

When ta<T, $b_{nta}$ is set as a time average from t=0 to t=$t_a$ in place of the expression (5).

The correction vector may also be the weighted average as in an expression (6).

$$b_{nta} = \frac{\sum_{t=ts}^{ta} \alpha_t l_{nt}}{\sum_{t=ts}^{ta} \alpha_t} \ (\alpha_{t-1} < \alpha_t) \qquad (6)$$

After obtaining $b_{nt}$, further, by a following equation (7), the obtained $b_{nt}$ is multiplied by a constant γ for adjusting a correction state to obtain a final correction vector $b_{nt}'$.

$$b_{nt}' = \gamma b_{nt} \qquad (7)$$

At step S105, it is judged whether to store the correction vector calculated by using the equations (1) to (7) in the correction vector storage unit 105. When this is stored, the procedure proceeds to the step S106, and when this is not stored, the procedure proceeds to the step S107. The judgment may be performed using any criterion. For example, the calculated correction vector may be stored each time without condition. Alternatively, it is possible to store once at constant frame interval, for example, every three frames.

At step S106, the correction vector is stored in the correction vector storage unit 105. An initial value of the correction vector having been stored in the correction vector storage unit 105 may be any value. For example, a 0 vector whose values of all dimensions are 0 or a vector indicating noise obtained by averaging out the feature vectors in a silent section in an input signal and the like may be used.

At step S107, the feature vector correcting unit 106 corrects the feature vector calculated at step S104 using the correction vector stored in the correction vector storage unit 105. For the correction at the time at which the correction vector is not stored in the correction vector storage unit 105, the correction vector stored the last time may be used as the correction vector at the time.

The correction method is represented by a following expression (8) by setting the correction vector at time t, the feature vector at time t, and the corrected feature vector to $b_t$, $x_t$, and $x'_t$, respectively.

$$x'_t = x_t - b_t \qquad (8)$$

At step S108, the pattern recognition unit 107 performs the speech recognition using the feature vector corrected by the feature vector correcting unit 106. As for a specific method of the speech recognition using a mixture distribution HMM, refer to the known documents.

In this embodiment, the speech recognition device is described by way of example. In this embodiment, each model is represented by both an average and an amount indicating variation of the distribution. The models correspond to different pieces of speech data or different speech data sets. Thus, an average of an input pattern and an amount indicating variation of the distribution of the input pattern are obtained, and models similar to the input pattern are selected based on the average and the amount thus obtained. Furthermore, the selected models are superimposed so as to generate a pattern having a few differences with the input pattern. In this manner, it is possible to recognize the input pattern. In other words, a modified amount of the feature vector is defined by the expression (1), and a correction amount is obtained from the average of the modified amounts relating to the selected models.

Meanwhile, the amount may be a multi-dimensional amount such as the vector or may be a scalar value (one-dimensional value). Therefore, the invention is may be applied to the pattern recognition device in which the model is represented by both an average and an amount indicating the feature of the distribution (such as variance and kurtosis).

Also, although the feature vector is time-series data in this embodiment, the present invention is may be applied to a case in which the input feature vector is not the time-series data, by directly setting the modified directional vector as the correction vector. In more detail, when calculating the correction vector, it is set that β=1 in the expression (4), and γ=1 in the expression (7).

(Second Embodiment)

In this embodiment, the speech recognition to which a method referred to as "pruning" is applied is performed in the speech recognition device using the Hidden Markov Model (HMM) having the mixture Gaussian distribution as the output probability distribution. In more detail, a result of this pruning is used when selecting the model.

Figure 3:
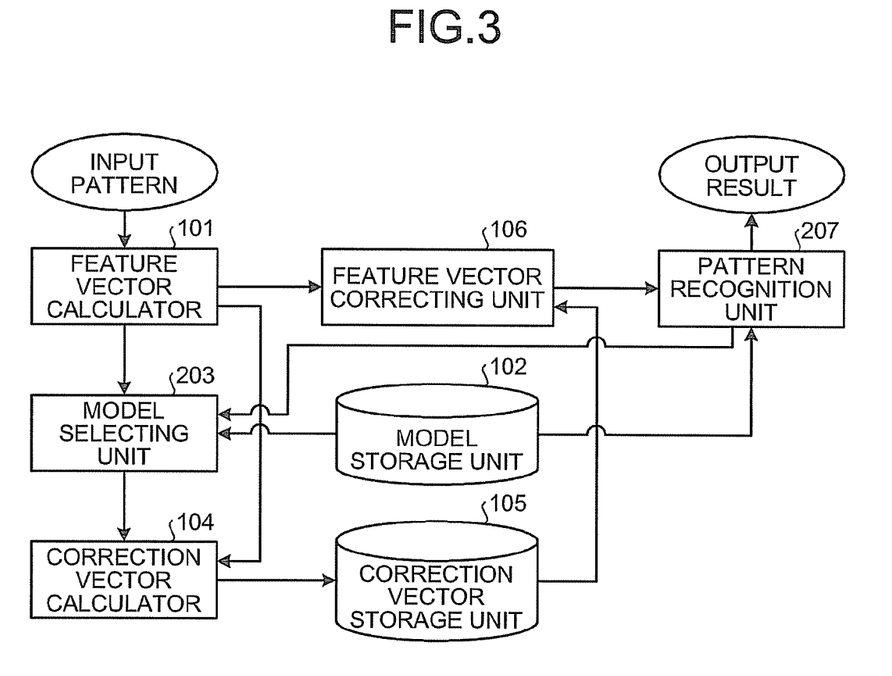
FIG. 3 is a block diagram showing the pattern recognition device according to a second embodiment.

FIG. 3 is a block diagram showing the pattern recognition device according to the second embodiment. The operations of the units to which the same reference numerals are given in FIGS. 1 and 3 are identical, and the descriptions thereof are not repeated herein.

A pattern recognition unit 207 has the same function to calculate the output result as the pattern recognition unit 107; however, this outputs model selection candidates to a model selecting unit 203. The model selecting unit 203 selects a model from the model selection candidates output from the pattern recognition unit 207. The operation to select the model is similar to that of the model selecting unit 103.

Figure 4:
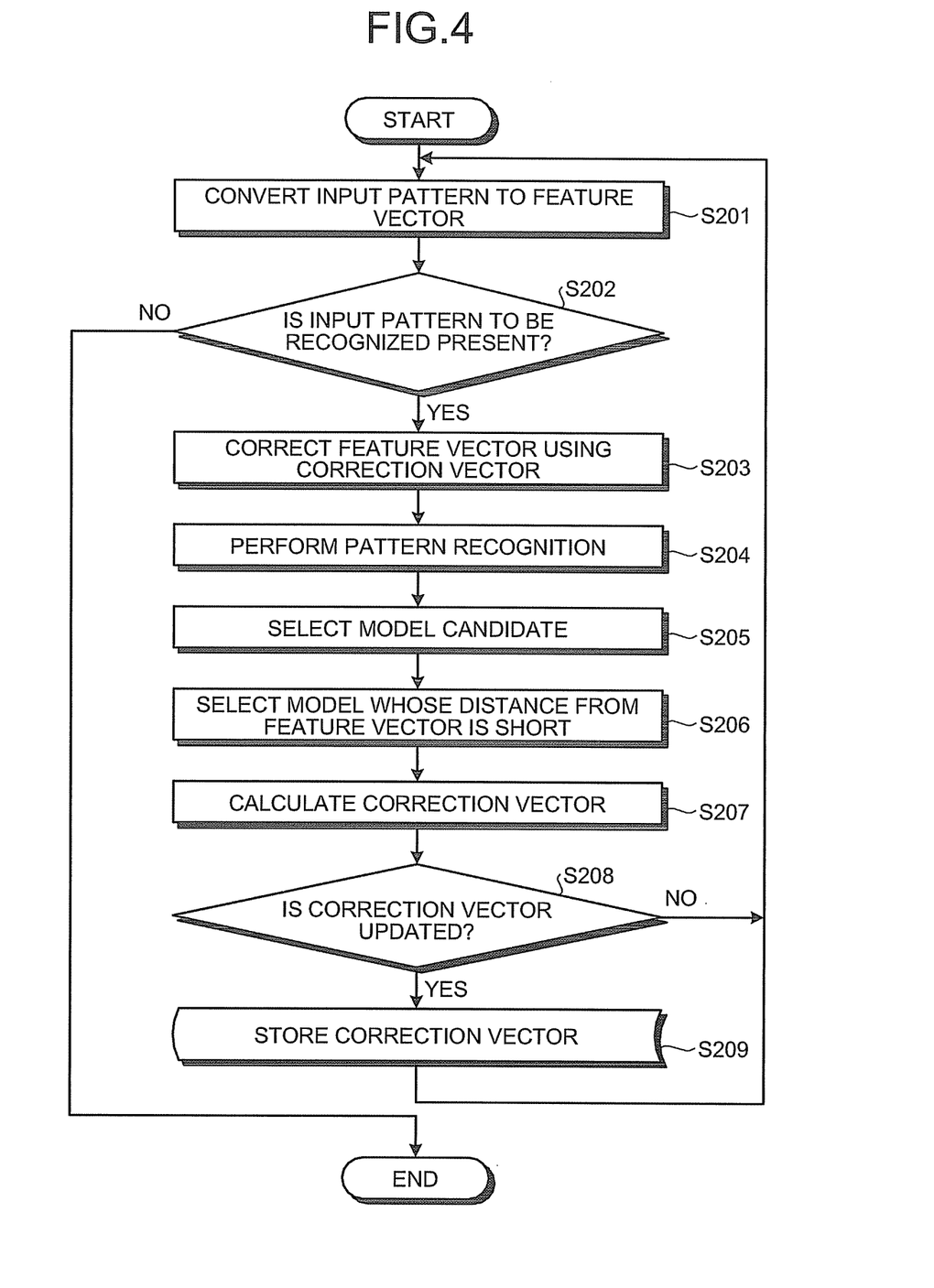
FIG. 4 is a view showing a flow chart for illustrating a pattern recognition method according to the second embodiment.

FIG. 4 is a flow chart for illustrating the pattern recognition method according to the second embodiment. At step S201 in FIG. 4, the speech waveform is converted to the feature vector for each frame. At step S202, it is judged whether the input pattern to be recognized is present. When there is no speech waveform to be processed being the recognition target, the speech recognition process is finished, and when there is the speech waveform, the procedure proceeds to a step S203.

At step S203, the feature vector correcting unit 106 reads out the correction vector stored in the correction vector storage unit 105 to correct the input feature vector.

At step S204, the pattern recognition unit 207 executes the speech recognition using the corrected feature vector. At that time, at time t, only a recognition result candidate(s) whose likelihood is equal to or larger than a predetermined threshold is set as the calculation target at time (t+1), and a candidate(s) whose likelihood is smaller than the threshold is removed from the calculation target. This is referred to as the "pruning".

In the first embodiment, a selection criterion of the model is to select the model whose "distance" from the input feature vector is short. At step S205, a model to be used in the calculation is selected from the model candidates remained as the calculation target after the pruning.

Processes at steps S206 and S207 are identical to the processes at steps S103 and S104 in FIG. 2, so that the description thereof is not repeated herein. The correction vector calculated at step S207 is used at step S203 at (t+1) being the next time.

Meanwhile, as another method of selecting the model, the method to further select only top X models whose distance from the input feature vector is short from the candidates remained after the pruning may be used.

At step S208, it is judged whether to store the correction vector calculated by using the expressions (1) to (7) in the correction vector storage unit 105. When this is stored, the procedure proceeds to a step S209, and when this is not stored, the procedure returns to the step S201 to repeat the processes. Any criterion may be used in the judgment. For example, the calculated correction vector may be stored each time without condition. Alternatively, it is possible to store once at constant frame interval, for example, every three frames.

At step S209, the correction vector is stored in the correction vector storage unit 105. An initial value of the correction vector having been stored in the correction vector storage unit 105 may be any value. For example, a 0 vector whose values of all dimensions are 0 or the vector indicating the noise obtained by averaging out the feature vectors in a silent section in the input signal and the like may be used.
(Execution by Computer and the Like)

Figure 5:
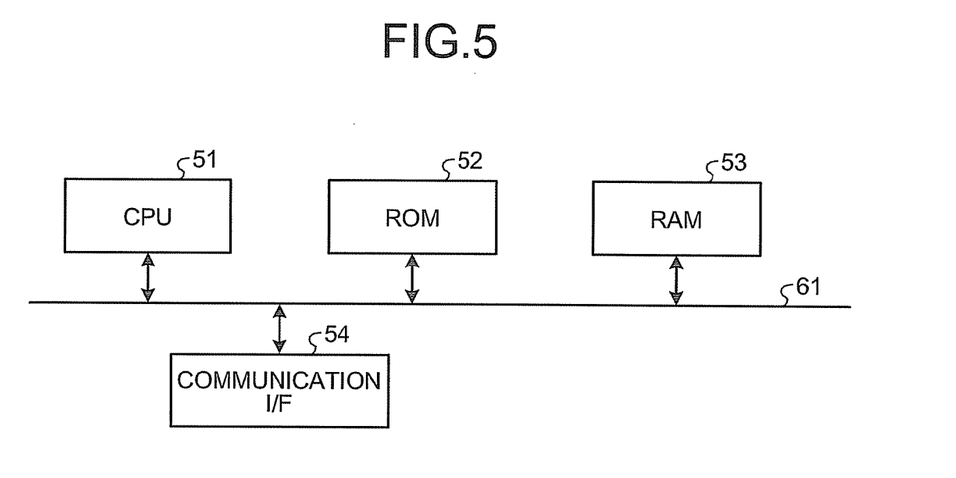
FIG. 5 is an illustration diagram showing a hardware configuration of the pattern recognition device according to the embodiment.

Next, a hardware configuration of the pattern recognition device according to any one or both of the first and second embodiments is described with reference to FIG. 5. FIG. 5 is an illustration diagram showing the hardware configuration of the pattern recognition device according to the embodiment.

The pattern recognition device according to this embodiment is provided with a control device such as a central processing unit (CPU) 51, a storage device such as a read only memory (ROM) 52 and a random access memory (RAM) 53, a communication I/F 54 for connecting to a network to communicate, and a bus 61 for connecting each unit.

The program executed in the pattern recognition device according to the embodiment is embedded in the ROM 52 and the like in advance and is provided.

The program executed in the pattern recognition device according to the embodiment may be configured to be recorded in a computer-readable recording medium such as a compact disk read only memory (CD-ROM), a flexible disk (FD), a compact disk recordable (CD-R) and a digital versatile disk (DVD) as an installable or executable file and provided.

Further, the program executed in the pattern recognition device according to the embodiment may be configured to be stored in the computer connected to the network such as the Internet and provided by download via the network. Also, the program executed by the pattern recognition device according to this embodiment may be configured to be provided or distributed via the network such as the Internet.

The program executed by the pattern recognition device according to this embodiment has a module configuration including the above-described each unit, and as an actual hardware, it is configured such that the CPU 51 reads the program from the above-described ROM 52 to execute, thereby loading the above-described each unit on a main storage, and the each unit is generated on the main storage.

The present invention is not limited to the above-described embodiments as they are, and may be embodied by modifying the structural components without departing from the spirit of the invention in a practical phase. In addition, various inventions may be attained by appropriately combining some of the structural components disclosed in the above-described embodiments. For example, some of the structural components may be eliminated from the structure of the embodiment. Furthermore, the structural components of different embodiments may be appropriately combined.

As described above, the pattern recognition device according to the embodiment of the present invention is useful in recognizing the input pattern of which bias sequentially changes, and especially suitable for the speech recognition.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A pattern recognition device comprising:
a feature vector calculator configured to calculate a feature vector from an input pattern including speech data, character data, or image data, the feature vector being used for speech recognition, character recognition, or image recognition;
a model selecting unit configured to select, from models, one or more selection models whose distances from the feature vector are within a predetermined range, each of the models being represented by both an average vector of a pattern and a variance vector indicating variance of the pattern, and the average vector and the variance vector each having N dimensional components (N≥1);

a correction vector calculator configured to calculate a correction vector based on a modified directional vector having the N dimensional components, a value of an n-th dimensional component (N≥n≥1) of the modified directional vector being an average value of one or more modified values, each of the modified values being obtained for one of the selection models and being obtained by multiplying a first value and a second value when the first value is greater than zero and being zero when the first value is less than or equal to zero, the first value being obtained by subtracting a value of the n-th dimensional component of the variance vector multiplied by a predetermined coefficient from a difference, and the second value being obtained by dividing a third value by the difference, wherein the third value is obtained by subtracting a value of the n-th dimensional component of the average vector from a value of the n-th dimensional component of the feature vector, and wherein the difference is a difference between the value of the n-th dimensional component of the average vector and the value of the n-th dimensional component of the feature vector;

a feature vector correcting unit configured to generate a corrected feature vector based on the correction vector and the feature vector; and a pattern recognition unit configured to perform the speech recognition, the character recognition or the image recognition by using the corrected feature vector.

2. The device according to claim 1, wherein the models have a mixture Gaussian distribution as an output probability density.

3. The device according to claim 1, wherein the correction vector is an average of the modified directional vectors, a weighted average obtained by multiplying each of the modified directional vectors by its likelihood, or the modified directional vector of the one or more selection models having highest likelihood out of the one or more selection models.

4. The device according to claim 1, wherein the feature vector calculator calculates the feature vector at each different time relative to the input pattern, and the correction vector calculator further sequentially averages out the correction vectors in a time direction.

5. The device according to claim 1, wherein when the n-th dimensional component of the first value has a negative value, the correction vector calculator sets a value of the n-th component of the modified directional vector to a predetermined value.

6. A computer program product having a non-transitory computer readable recording medium including programmed instructions that, when executed by a computer, cause the computer to perform:

calculating a feature vector from an input pattern including speech data, character data, or image data, the feature vector being used for speech recognition, character recognition, or image recognition;

selecting, from models, one or more selection models whose distances from the feature vector are within a predetermined range, each of the models being represented by both an average vector of a pattern and a variance vector indicating variance of the pattern, and the average vector and the variance vector each having N dimensional components (N≥1);

calculating a correction vector based on a modified directional vector having the N dimensional components, a value of an n-th dimensional component (N≥n≥1) of the modified directional vector being an average value of one or more modified values, each of the modified values being obtained for one of the selection models and being obtained by multiplying a first value and a second value when the first value is greater than zero and being zero when the first value is less than or equal to zero, the first value being obtained by subtracting a value of the n-th dimensional component of the variance vector multiplied by a predetermined coefficient from a difference, and the second value being obtained by dividing a third value by the difference, wherein the third value is obtained by subtracting a value of the n-th dimensional component of the average vector from a value of the n-th dimensional component of the feature vector, and wherein the difference is a difference between the value of the n-th dimensional component of the average vector and the value of the n-th dimensional component of the feature vector;

generating a corrected feature vector based on the correction vector and the feature vector; and performing the speech recognition, the character recognition or the image recognition by using the corrected feature vector.

7. A pattern recognition method comprising:

employing at least one processor executing computer executable instructions embodied on at least one computer readable recording medium to perform operations comprising:

calculating a feature vector from an input pattern including speech data, character data, or image data, the feature vector being used for speech recognition, character recognition, or image recognition;

selecting, from models, one or more selection models whose distances from the feature vector are within a predetermined range, each of the models being represented by both an average vector of a pattern and a variance vector indicating variance of the pattern, and the average vector and the variance vector each having N dimensional components (N≥1);

calculating a correction vector based on a modified directional vector having the N dimensional components, a value of an n-th dimensional component (N≥n≥1) of the modified directional vector being an average value of one or more modified values, each of the modified values being obtained for one of the selection models and being obtained by multiplying a first value and a second value when the first value is greater than zero and being zero when the first value is less than or equal to zero, the first value being obtained by subtracting a value of the n-th dimensional component of the variance vector multiplied by a predetermined coefficient from a difference, and the second value being obtained by dividing a third value by the difference, wherein the third value is obtained by subtracting a value of the n-th dimensional component of the average vector from a value of the n-th dimensional component of the feature vector, and wherein the difference is a difference between the value of the n-th dimensional component of the average vector and the value of the n-th dimensional component of the feature vector;

generating a corrected feature vector based on the correction vector and the feature vector; and performing the speech recognition, the character recognition or the image recognition by using the corrected feature vector.

8. The device according to claim 1, wherein
the feature vector calculator calculates the feature vector used for the speech recognition from the input pattern associated with the speech data; and
the pattern recognition unit performs recognition of the input pattern to facilitate the speech recognition by using the corrected feature vector.

9. The computer program product according to claim 6, wherein
the calculating the feature vector includes calculating the feature vector used for the speech recognition from the input pattern associated with the speech data; and
recognition of the input pattern is performed to facilitate the speech recognition by using the corrected feature vector.

10. The pattern recognition method according to claim 7, wherein
the calculating the feature vector includes calculating the feature vector used for the speech recognition from the input pattern associated with the speech data; and
recognition of the input pattern is performed to facilitate the speech recognition by using the corrected feature vector.

* * * * *